US008163126B2

(12) United States Patent
Harada et al.

(10) Patent No.: US 8,163,126 B2
(45) Date of Patent: Apr. 24, 2012

(54) FILM STICKING DEVICE, FILM STICKING METHOD, AND ELECTRONIC PAPER MANUFACTURING METHOD

(75) Inventors: Tohru Harada, Kawasaki (JP);
Kazuhisa Mishima, Kawasaki (JP);
Hirokazu Yamanishi, Kawasaki (JP);
Yoshiaki Yanagida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/020,312

(22) Filed: Feb. 3, 2011

(65) Prior Publication Data

US 2011/0120619 A1   May 26, 2011

Related U.S. Application Data

(63) Continuation of application No. PCT/JP2008/064547, filed on Aug. 13, 2008.

(51) Int. Cl.
*B29C 65/00* (2006.01)
*B29C 65/10* (2006.01)
*B29C 45/00* (2006.01)
*B29C 47/00* (2006.01)
*B29C 43/02* (2006.01)
*B29C 49/00* (2006.01)
*B29C 51/00* (2006.01)
*B32B 37/00* (2006.01)
*B44C 1/17* (2006.01)
*B23K 37/00* (2006.01)
*B30B 5/02* (2006.01)
*B30B 5/04* (2006.01)
*B30B 15/34* (2006.01)
*B29D 24/00* (2006.01)
*B29D 29/00* (2006.01)
B28B 21/36 (2006.01)
B28B 11/08 (2006.01)
A01J 21/00 (2006.01)
A01J 25/12 (2006.01)
A21C 3/00 (2006.01)
A21C 11/00 (2006.01)
A23G 1/20 (2006.01)
A23G 3/02 (2006.01)
A23P 1/00 (2006.01)
B29C 55/28 (2006.01)

(52) U.S. Cl. ........ 156/285; 156/228; 156/233; 156/235; 156/239; 156/241; 156/497; 156/538; 156/580; 156/583.1; 264/511; 264/553; 425/504; 425/388

(58) Field of Classification Search ................. 156/228, 156/233, 235, 239, 241, 497, 538, 580, 583.1, 156/285; 264/511, 553; 425/504, 388
See application file for complete search history.

(56) References Cited

U.S. PATENT DOCUMENTS 4,927,479 A * 5/1990 Bock ............................ 156/228
2007/0111014 A1* 5/2007 Katsoulis et al. ............ 428/447

FOREIGN PATENT DOCUMENTS

JP   61-500311 A   2/1986
JP   62-229221 A   10/1987
JP   2005-161528 A   6/2005

OTHER PUBLICATIONS

International Search Report of PCT/JP2008/064547, mailing date Oct. 14, 2008.

* cited by examiner

*Primary Examiner* — Khanh P Nguyen
*Assistant Examiner* — Matthew Hoover
(74) *Attorney, Agent, or Firm* — Westerman, Hattori, Daniels & Adrian, LLP

(57) ABSTRACT

Disclosed is a film sticking device that sticks a first film substrate and a second film substrate together on a curved-surface shape. The film sticking device includes a mold having a curved attachment surface formed into a desired curved-surface shape; an attracting and holding unit capable of relatively moving on the curved attachment surface and having plural vacuum chambers on which an attracting surface for attracting and holding the second film substrate is provided; and a suctioning unit capable of separately applying suction processing to the plural vacuum chambers. The suctioning unit starts, as the attracting and holding unit moves, the suction processing of the vacuum chamber corresponding to a position opposing the second film substrate and sequentially stops, as the second film substrate is stuck to the first film substrate, the suction processing of the vacuum chamber corresponding to the stuck second film substrate.

4 Claims, 10 Drawing Sheets

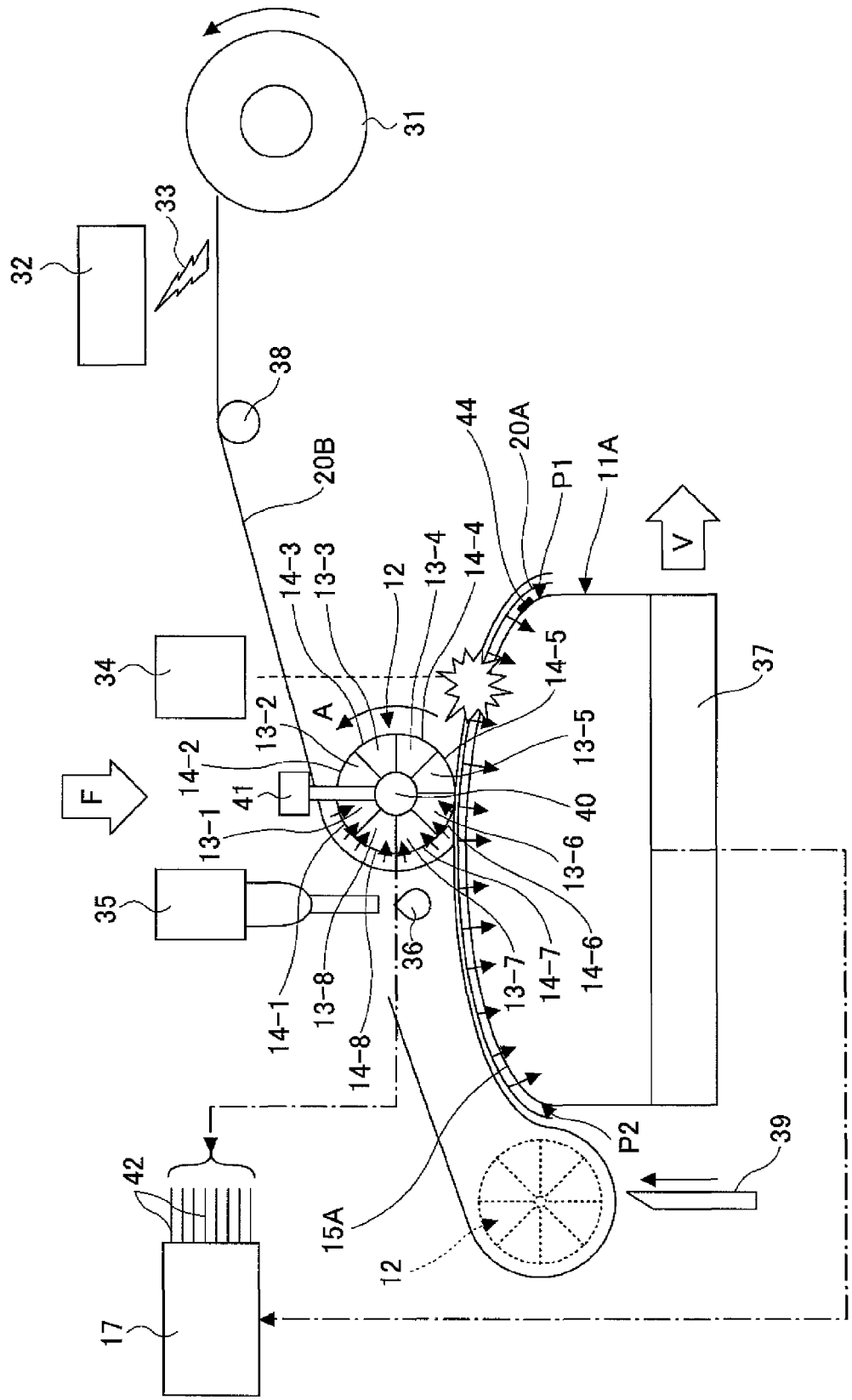

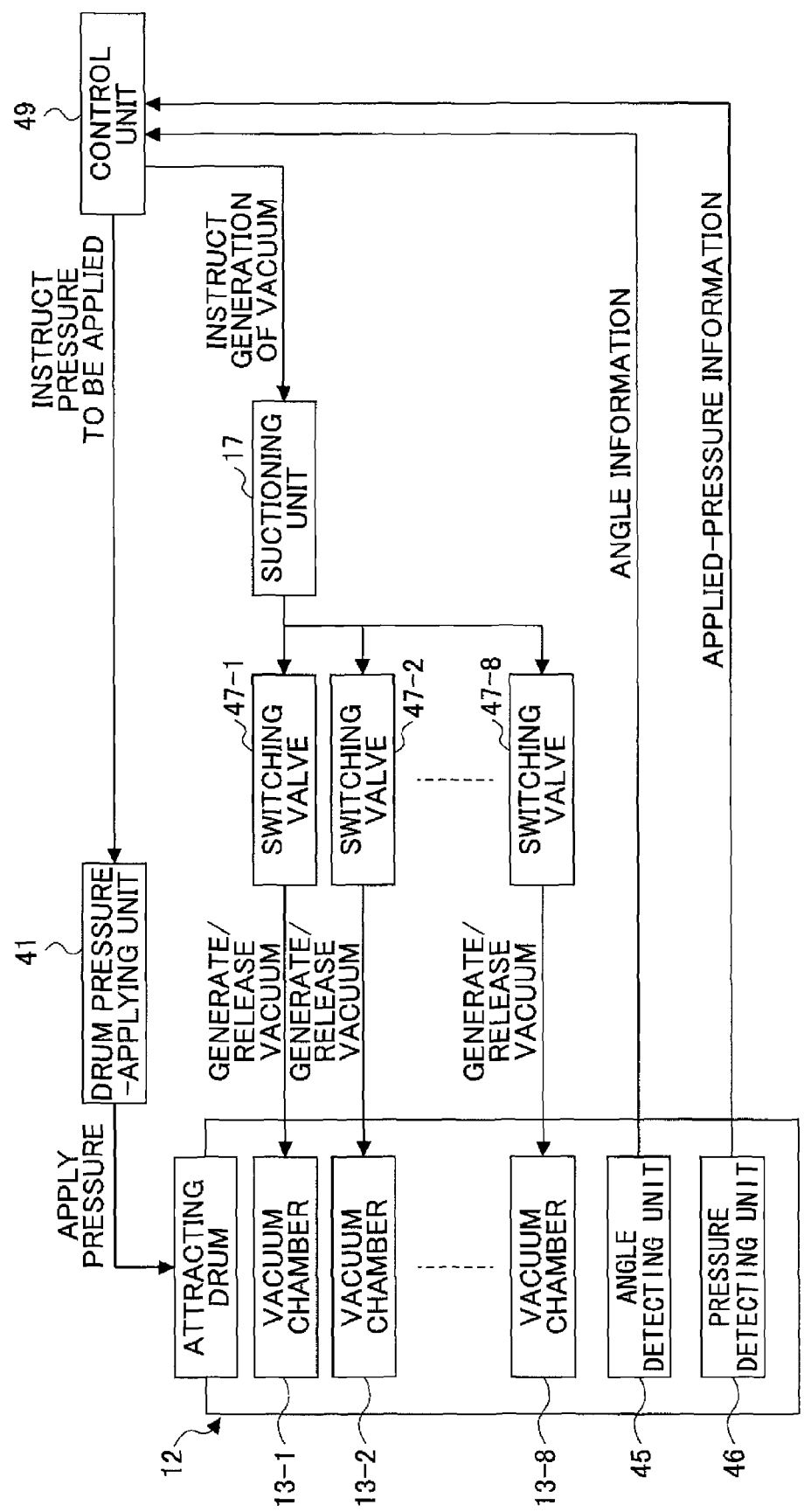

FILM STICKING DEVICE, FILM STICKING METHOD, AND ELECTRONIC PAPER MANUFACTURING METHOD

CROSS-REFERENCE TO RELATED APPLICATION

This application is a U.S. continuation application filed under 35 U.S.C. 111(a) claiming benefit under 35 U.S.C. 120 and 365(c) of PCT application JP2008/064547, filed on Aug. 13, 2008, the entire contents of which are incorporated herein by reference.

FIELD

The embodiment discussed herein is generally related to film sticking devices, film sticking methods, and electronic paper manufacturing methods, and in particular, to a film sticking device that curves and sticks plural film substrates together, a film sticking method, and an electronic paper manufacturing method.

BACKGROUND

Up until now, there have been discussed methods for manufacturing a plastic laminated body configured to shorten a processing time while avoiding influences by resin flowing and problems in contraction distribution at the time of cooling, to have a high freedom degree in constituent members of a film and a base material, and not to be required to process a mold for shaping the base material with high precision.
Patent Document 1: Japanese Laid-open Patent Publication No. 2005-161528

SUMMARY

According to an aspect of the present invention, there is provided a film sticking device that sticks a first film substrate and a second film substrate together on a curved-surface shape, the film sticking device including a mold having a curved attachment surface to which the first film substrate is attached, the curved attachment surface being formed into a desired curved-surface shape; an attracting and holding unit that is configured to be capable of relatively moving on the curved attachment surface and has plural vacuum chambers on which an attracting surface for attracting and holding the second film substrate is provided; and a suctioning unit capable of separately applying suction processing to the plural vacuum chambers; wherein the suctioning unit is configured to start, as the attracting and holding unit moves, the suction processing of the vacuum chamber corresponding to a position opposing the second film substrate and sequentially stop, as the second film substrate is stuck to the first film substrate, the suction processing of the vacuum chamber corresponding to the stuck second film substrate.

The object and advantages of the present invention will be realized and attained by means of the elements and combinations particularly pointed out in the claims.

It is to be understood that both the foregoing general description and the following detailed description are exemplary and explanatory and are not restrictive of the present invention, as claimed.

BRIEF DESCRIPTION OF DRAWINGS

FIG. 5 is a configuration diagram of the film sticking device according to an embodiment of the present invention;

FIG. 7 is a block diagram showing the control system of the attracting drum of the film sticking device according to the embodiment of the present invention;

DESCRIPTION OF EMBODIMENTS

It has been expected that, for example, advertising on trains and POP (point of purchase) advertising on streets be replaced by electronic papers from the viewpoint of saving paper resources and low power consumption. In applying the electronic papers, installation places are assumed to be those having curved surfaces such as upper parts on trains and poles of buildings. To obtain high durability and secured visibility required for applying the electronic papers, it is desirable that the electronic papers be shipped after being formed into a desired curved-surface shape in a manufacturing step.

Figure 1A:
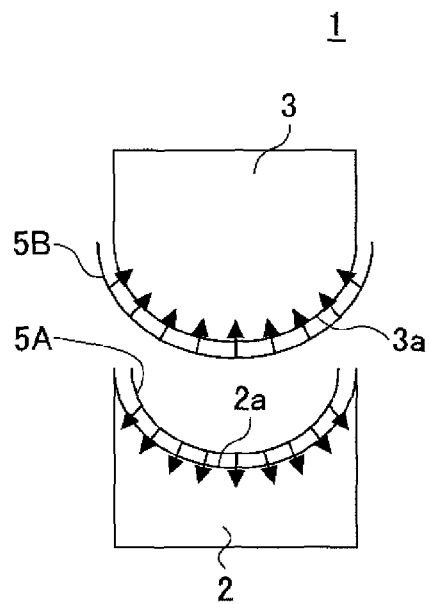
FIG. 1A is a schematic configuration diagram of a film sticking device as an example of a conventional technique (before film substrates are stuck together)
Figure 1B:
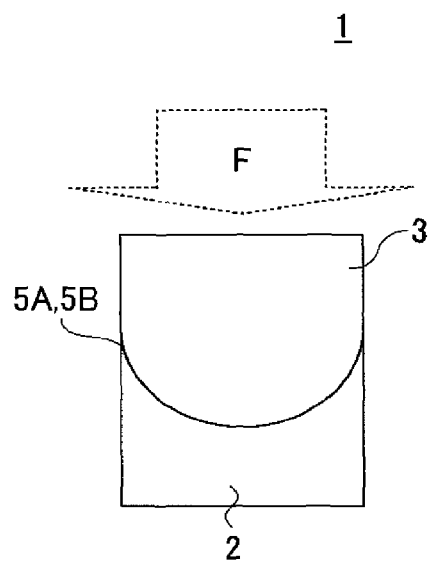
FIG. 1B is a schematic configuration diagram of the film sticking device as the example of the conventional technique (when the film substrates are stuck together)

Further, in one of electronic paper manufacturing steps, plural film substrates are stuck together. In forming a curved-surface shape in this step, however, a present technique (see Patent Document 1) includes laminating plural resin sheets with each other. Specifically, the lamination of the sheets is performed according to the following method. First, as illustrated in FIG. 1A, two types of molds, i.e., a female mold 2 formed into a desired curved-surface shape and a male mold 3 formed into a shape opposing the female mold 2, are prepared. Then, film substrates 5A and 5B to be stuck together are attracted and held by the female mold 2 and the male mold 3. Subsequently, as illustrated in FIG. 1B, pressure (as indicated by an arrow F) is applied to the two types of molds 2 and 3 in an engaged state. Thus, the film substrates 5A and 5B are stuck together.

However, the above method causes the following problems (a) through (d).

(a) The two types of dedicated molds 2 and 3 become essential, and the surfaces (as indicated by numerals 2a and 3a in FIG. 1A) of the opposing molds 2 and 3 require high processing accuracy so as to be engaged with each other.

(b) When three or more film substrates are stuck together, a curvature radius is varied in accordance with an increase in the thickness of the film substrates. Therefore, a mold having a different curvature radius is separately required.

(c) Since the entire surfaces of the film substrates are stuck together at once, air bubbles existing in an adhesive or the like are not released. To release the air bubbles, an air-bubbles releasing step is separately required after the substrates are stuck together.

(d) In applying an adhesive for sticking the substrates together, unevenness occurs in the adhesive due to the curved shapes of the molds 2 and 3, which results in the thickness of a product being uneven.

In order to solve the above problems, the present invention may have a general object of providing an improved useful film sticking device, a film sticking method, and an electronic paper manufacturing method.

More specifically, the present invention may have an object of providing a film sticking device capable of reliably sticking together plural film substrates formed into a curved surface without causing air bubbles to remain inside the film substrates by the use of a simple manufacturing facility, a film sticking method, and an electronic paper manufacturing method.

Next, referring to the accompanying drawings, a description is made of an embodiment of the present invention.

Figure 2:
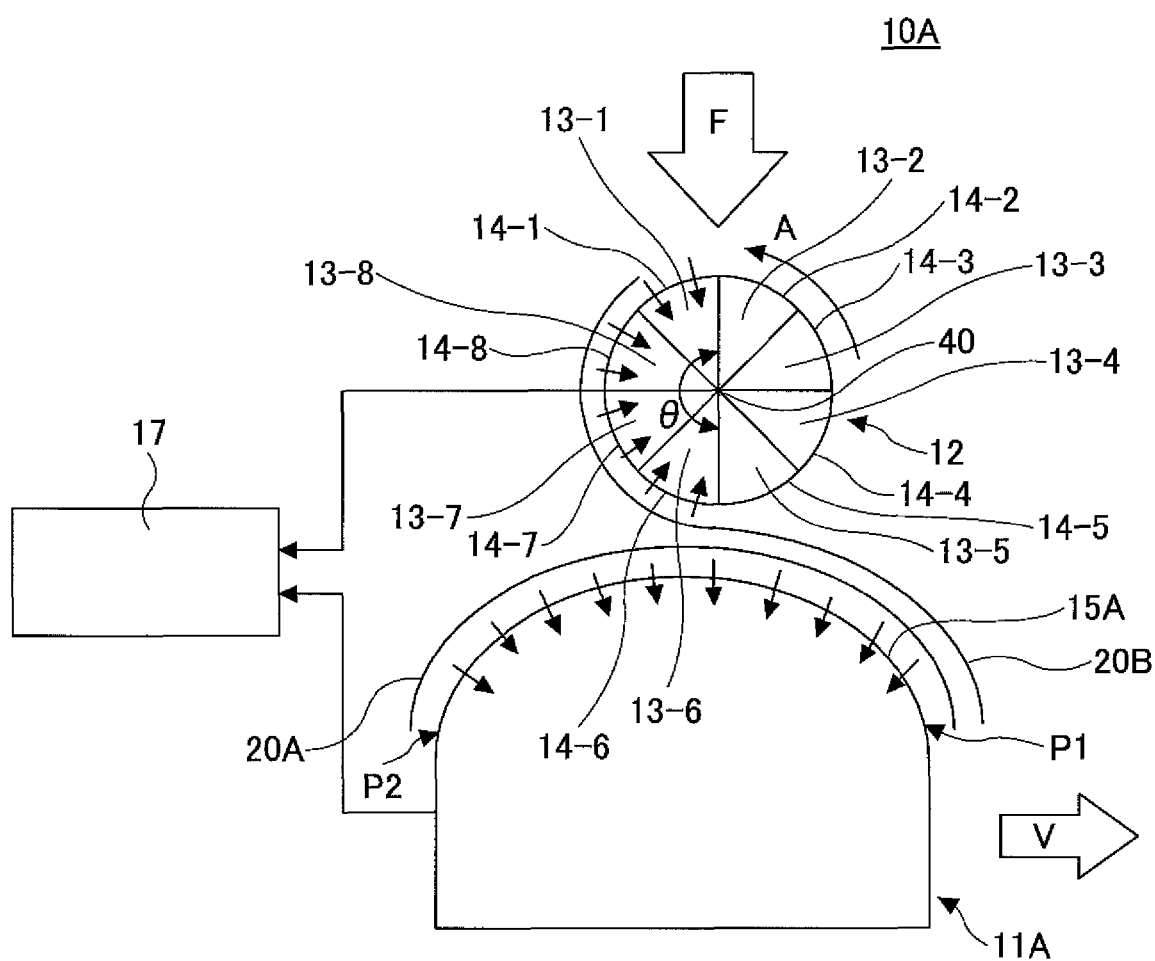
FIG. 2 is a diagram illustrating the basic configuration of a film sticking device as an example of the present invention, in which a curved attracting surface is formed into an upwardly projecting shape.
Figure 3:
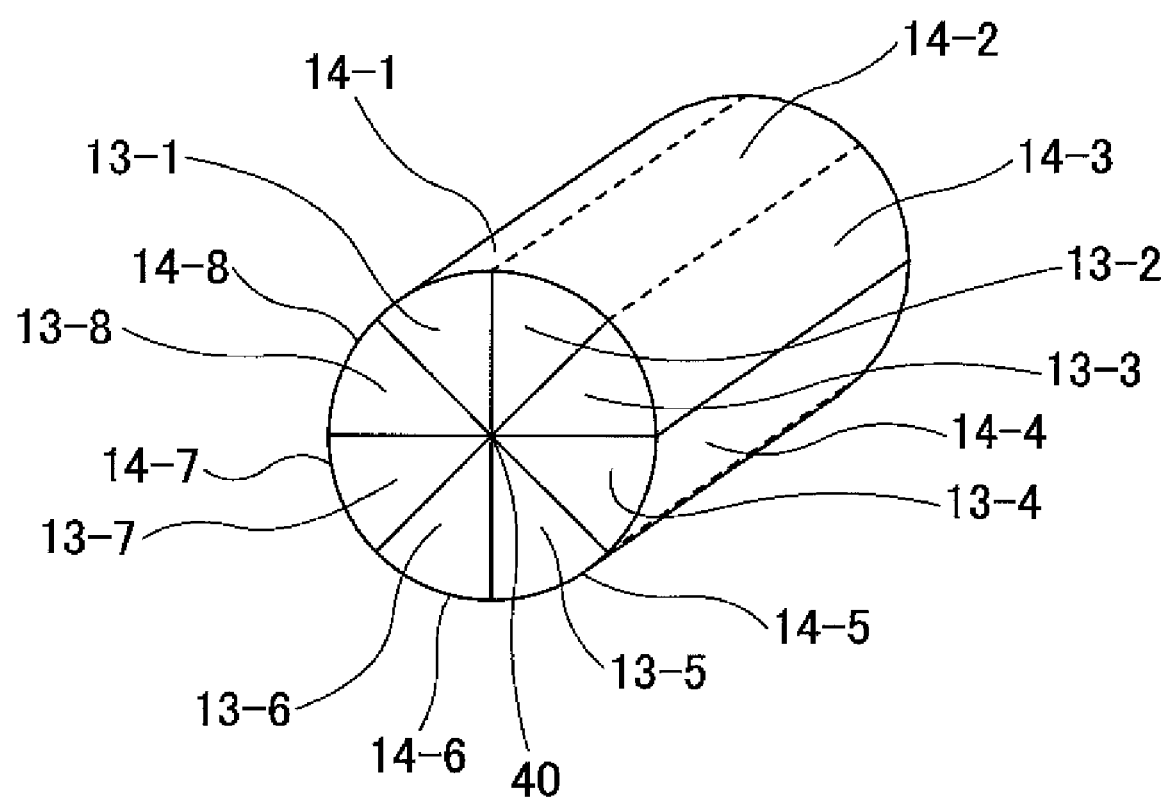
FIG. 3 is a schematic diagram illustrating the enlarged view of the attracting and holding unit of the film sticking device illustrated in FIG. 2.

FIG. 2 is a diagram illustrating the basic configuration of a film sticking device 10A as an example of the present invention. FIG. 3 is a diagram illustrating the enlarged view of an attracting and holding unit 12 provided in the film sticking device 10A. The film sticking device 10A is a device that sticks a film substrate 20A and a film substrate 20B together. The film sticking device 10A is composed of a mold 11A, the attracting and holding unit 12, a suctioning unit 17, and the like.

The mold 11A has a curved attracting surface 15A (specifically, a projecting semi-cylindrical surface) on its side opposing the attracting and holding unit 12. In an example illustrated in FIG. 2, the curved attracting surface 15 projects upwardly. The curved attracting surface 15A has a multiplicity of minute holes formed therein, and the mold 11A is connected to the suctioning unit 17. As the suctioning unit 17 is driven, suction processing is applied through the minute holes of the curved attracting surface 15A. Accordingly, the film substrate 20A is attracted onto the curved attracting surface 15A. Thus, the film substrate 20A is attached to the mold 11A.

As illustrated in an enlarged view in FIG. 5, the attracting and holding unit 12 has a cylindrical shape as a whole and configured to rotate about a rotary shaft 40 in a direction as indicated by an arrow A in FIG. 5. As described below, the attracting and holding unit 12 has the function of sticking (attaching) the film substrate 20B to the film substrate 20A by relatively moving on the mold 11A while appropriately holding or not holding the film substrate 20B.

Further, as to the relative movement of the mold 11A with respect to the attracting and holding unit 12, it may be also arranged that the mold 11A is moved with the attracting and holding unit 12 fixed or the attracting and holding unit 12 is moved with the mold 11A fixed. Note that prior to this stick processing, an adhesive is applied to at least one of the film substrate 20A and the film substrate 20B.

The attracting and holding unit 12 has internally plural (eight in this embodiment) vacuum chambers of a first vacuum chamber 13-1 through an eighth vacuum chamber 13-8. The peripheral surfaces of the first vacuum chamber 13-1 through the eighth vacuum chamber 13-8 are, respectively, a first attracting surface 14-1 through an eighth attracting surface 14-8 having a multiplicity of minute holes formed therein.

Further, the suctioning unit 17 is also connected to the attracting and holding unit 12 and configured to be capable of applying the suction processing to the first vacuum chamber 13-1 through the eighth vacuum chamber 13-8. In this case, the suctioning unit 17 is configured to be capable of separately applying the suction processing to each of the first vacuum chamber 13-1 through the eighth vacuum chamber 13-8.

Accordingly, as the suctioning unit 17 is driven, the suction processing is applied through the minute holes of the first attracting surface 14-1 through the eighth attracting surface 14-8 of the first vacuum chamber 13-1 through the eighth attracting surface 13-8. Thus, the film substrate 20B is attached to the attracting and holding unit 12.

At this time, since the suctioning unit 17 is configured to be capable of separately applying the suction processing to each of the first vacuum chamber 13-1 through the eighth vacuum chamber 13-8, the attracting and holding unit 12 can hold the film substrate 20B over its prescribed angle range rather than at its entire circumference.

For example, when the suctioning unit 17 applies the suction processing only to the first vacuum chamber 13-1, the film substrate 20B is attracted and held only by the first attracting surface 14-1. Further, when the suctioning unit 17 applies the suction processing only to the second vacuum chamber 13-2 and the third vacuum chamber 13-3, the film substrate 20B is attracted and held only by the second attracting surface 14-2 and the third attracting surface 14-3.

Next, a description is made of the operations of the film sticking device 10A thus configured.

In the example illustrated in FIG. 2, the mold 11A moves in a direction as indicated by an arrow V in FIG. 2 with the attracting and holding unit 12 fixed. Thus, the attracting and holding unit 12 is configured to relatively moving on the curved attracting surface 15A of the mold 11A in a direction (a left direction in FIG. 2) opposite to the direction as indicated by the arrow V.

After the film substrate 20A is positioned and placed on the curved attracting surface 15A, the suctioning unit 17 applies the suction processing to the mold 11A. Consequently, the film substrate 20A is held on the curved attracting surface 15A by the suctioning force of the suctioning unit 17.

At the time of starting stick processing for the film substrate 20A and the film substrate 20B (hereinafter referred to as a sticking start time), the attracting and holding unit 12 is at a position (hereinafter referred to as a sticking start position) as indicated by an arrow P1 on the curved attracting surface 15A in FIG. 2. Further, at the sticking start time, the attracting and holding unit 12 holds the film substrate 20B over a range of 180° of its periphery.

As described above, the attracting and holding unit 12 has the first vacuum chamber 13-1 through the eighth vacuum chamber 13-8. Along with the movement of the attracting and holding unit 12, the suctioning unit 17 applies the suction processing to the vacuum chamber at a position where the film substrate 20B opposes the front surface of the attracting and holding unit 12. Thus, the film substrate 20B is held by the attracting surface to which the suction processing is applied.

Conversely, as the film substrate 20B is stuck to the film substrate 20A along with the movement of the attracting and holding unit 12, the suctioning unit 17 successively stops the suction processing with respect to the vacuum chambers corresponding to the stuck second film substrate 20B. Switching of the suction processing with respect to the vacuum chambers is serially performed until the attracting and holding unit 12 moves from the sticking start position P1 to a sticking end position P2 (as indicated by an arrow in FIG. 2) after the sticking start time.

Referring to FIG. 2 illustrating a state in which the attracting and holding unit 12 moves to a substantially central position of the curved attracting surface 15, a description is now made of the specific operations of the above processing.

In the state illustrated in FIG. 2, when the attracting and holding unit 12 rotates in the direction as indicated by the arrow A while the mold 11A relatively moves to the direction as indicated by the arrow V, the first vacuum chamber 13-1 is caused to oppose the film substrate 20B. Thus, the suctioning unit 17 starts applying the suction processing to the first vacuum chamber 13-1. Accordingly, when the film substrate 20B contacts the first attracting surface 14-1, the film substrate 20B is held by the first attracting surface 14-1.

Conversely, in the state illustrated in FIG. 2, when the attracting and holding unit 12 rotates in the direction as indicated by the arrow A while the mold 11A relatively moves to the direction as indicated by the arrow V, the film substrate 20B held by the sixth attracting surface 14-6 is stuck to the film substrate 20A. However, if the suction processing with respect to the sixth vacuuming chamber 13-6 continues after the film substrate 20B is stuck to the film substrate 20A, the retaining force (suctioning force) of the film substrate 20B at the sixth attracting surface 14-6 acts in turn as a force for separating the film substrate 20B from the film substrate 20A.

In view of this problem, the suctioning unit 17 is configured to stop the suction processing with respect to the sixth vacuum chamber 13-6 corresponding to the sticking end position after the film substrate 20B is stuck to the film substrate 20A. By the implementation of the above processing along with the movement of the attracting and holding unit 12 on the curved attracting surface 15A and the rotation of the attracting and holding unit 12 about the drum rotary shaft 40, the film substrate 20B can be reliably held over a prescribed range (over a range of 180° as indicated by θ in FIG. 2) where the film substrate 20B opposes the attracting and holding unit 12. Further, since the holding of the film substrate 20B is immediately released after the film substrate 20B is stuck to the film substrate 20A, the separation of the film substrate 20B from the film substrate 20A caused by the attracting and holding unit 12 can be surely prevented.

As described above, the film sticking device 10A illustrated in FIG. 2 is configured to stick and shape the film substrates 20A and 20B by moving the cylindrical attracting and holding unit 12 on the curved attracting surface 15A having a desired shape provided on the mold 11A. Therefore, unlike a conventional technique, the only one mold (the mold 11A) is required. That is, since the number of molds leading to high manufacturing costs can be reduced, the cost reduction of the film sticking device 10A is attainable. Further, since the two molds are not essential as in the case described above and high-accuracy molding processing is not required to engage the two molds with each other, the cost reduction is also attainable.

Further, the above example describes a case where the two film substrates 20A and 20B are stuck together. However, even in a case where three or more film substrates are stuck together, the stick processing can be performed without replacing the mold 11A. That is, if the number of film substrates to be laminated is increased, a curvature radius is varied in accordance with an increase in the thickness of the film substrates. Where the curvature radius of the film substrates is varied by the lamination of the film substrates as described above, the conventional method, in which the two molds 5A and 5B (see FIGS. 1A and 1B) are engaged to shape the substrates, requires plural molds in accordance with variations in the curvature radius.

Conversely, in the film sticking device 10A described above, the film substrates are laminated with each other on the curved attracting surface 15A. Therefore, even if the curvature radius of the film substrates is varied, another film substrate is laminated on the upper part of the film substrates and the suctioning and holding unit 12 moving on the upper part performs the stick processing and the shape processing. Consequently, there is no need to change the mold in the film sticking device 10A.

Further, the film sticking device 10A is configured such that the attracting and holding unit 12 moves on the curved attracting surface 15A from the sticking start position P1 to the sticking end position P2. Therefore, even if air bubbles exist in an adhesive (not shown) used for bonding the film substrates 20A and 20B to each other, the air bubbles are forced to move to the sticking end position P2 along with the movement of the attracting and holding unit 12 and then released from the end of the attracting and holding unit 12 to an outside. Accordingly, since there is no need to separately perform air-bubble release processing after the film substrates 20A and 20B are stuck together, the simplification of the stick processing is attainable. Moreover, for the same reason, the occurrence of unevenness in an adhesive can be prevented.

Note that if, for example, substrates having liquid crystal for an electronic paper formed therein are used as the film substrates 20A and 20B, these substrates have higher rigidity than general-purpose resin films and are thus hard to be bent. Therefore, if the electronic paper is applied to the mold 11A having the projecting curved attracting surface 15A illustrated in FIG. 2, variations would occur in the initial curved shape of the electronic papers, which may interfere with an appropriate display.

Figure 4:
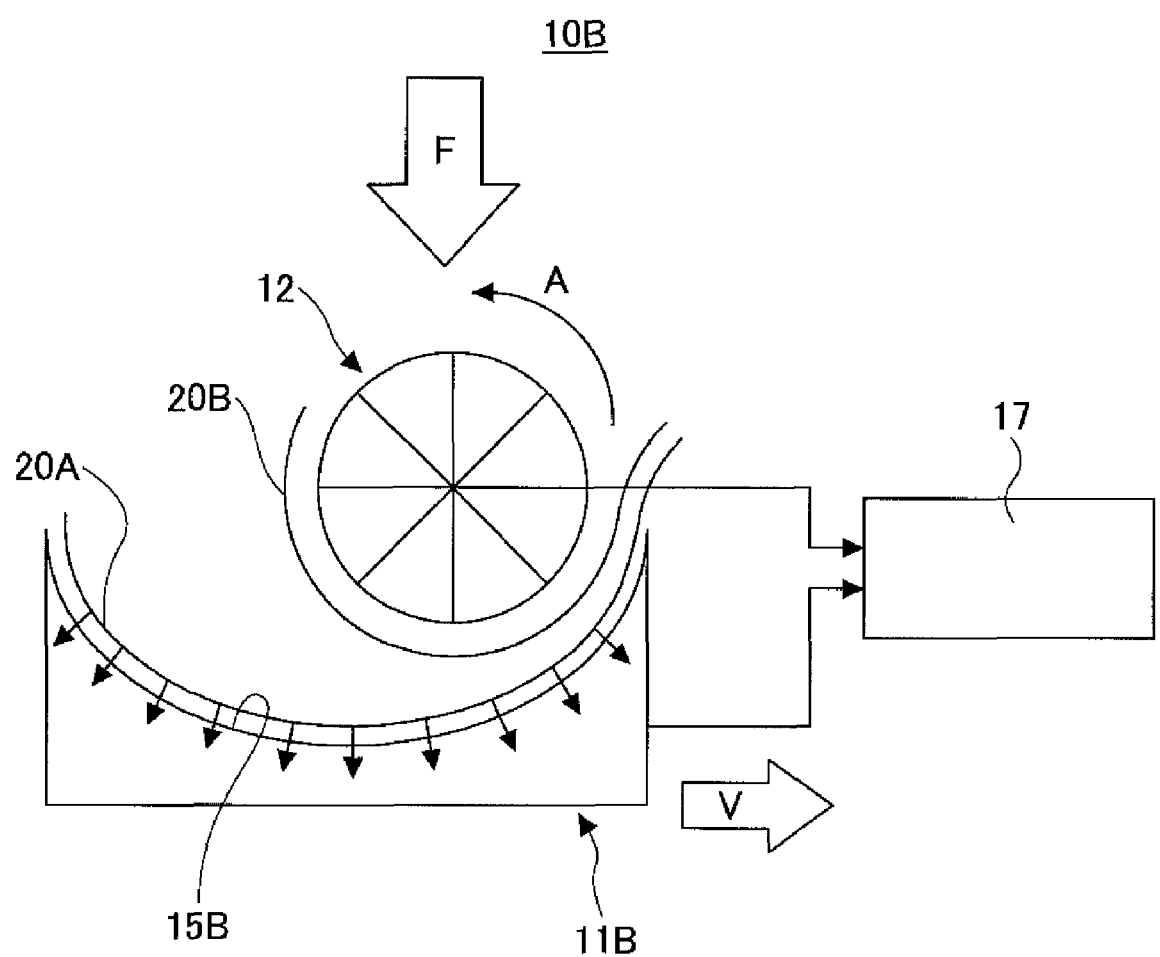
FIG. 4 is a diagram illustrating the basic configuration of a film sticking device as an example of the present invention, in which a curved attracting surface is formed into a recessed shape.

In this case, it is effective to use a mold 11B having a recessed curved attracting surface 15B as illustrated in FIG. 4. Further, if a liquid crystal implanting step is performed after all film substrates are laminated with each other, physical influences on liquid crystal due to the lamination of the film substrates can be prevented.

Next, a description is made of a film sticking device according to an embodiment of the present invention based on the basic principle described above.

Figure 8:
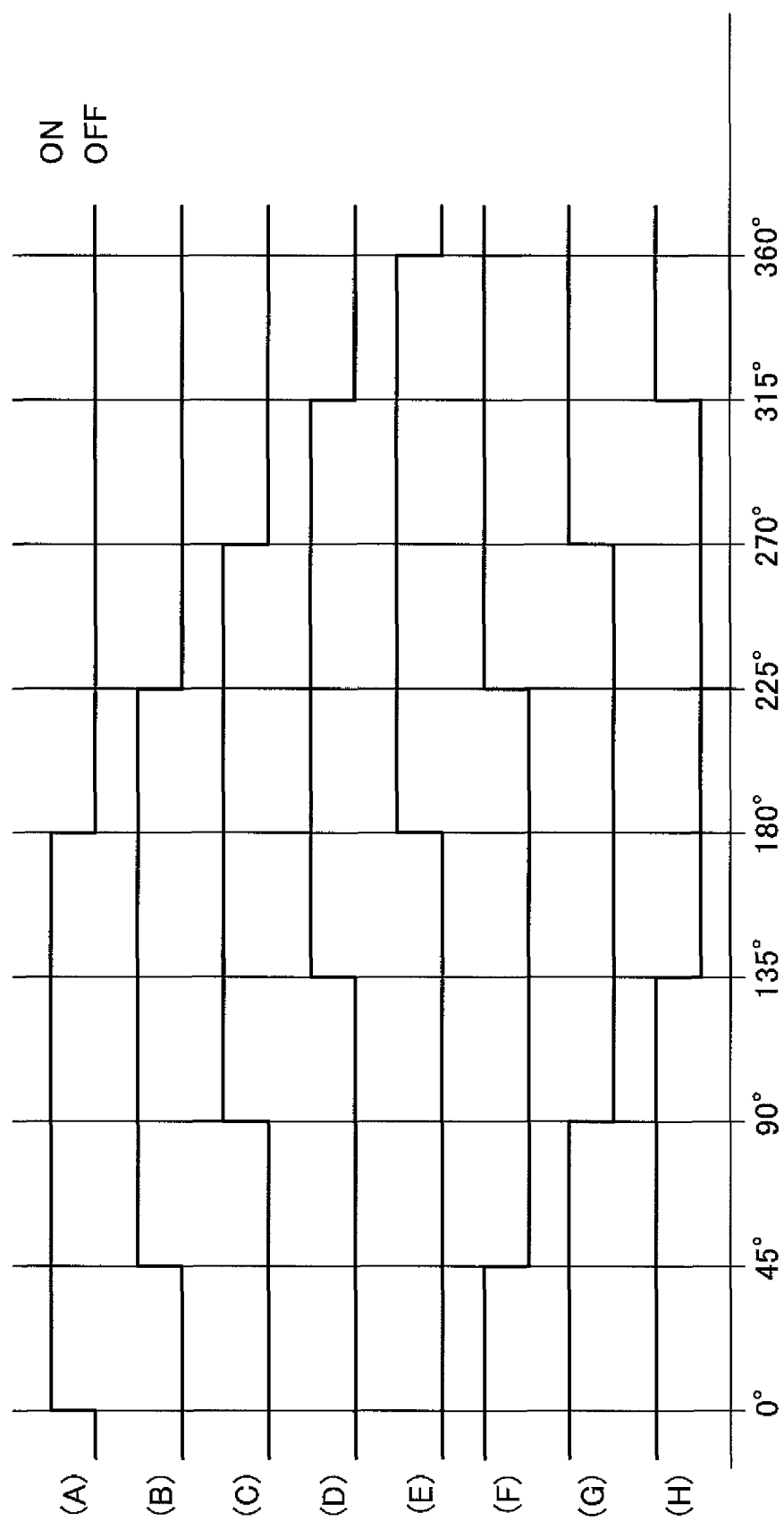
FIG. 8 is a timing chart illustrating the timings of the ON/OFF for suction processing with respect to the vacuum chambers of the attracting drum.
Figure 9:
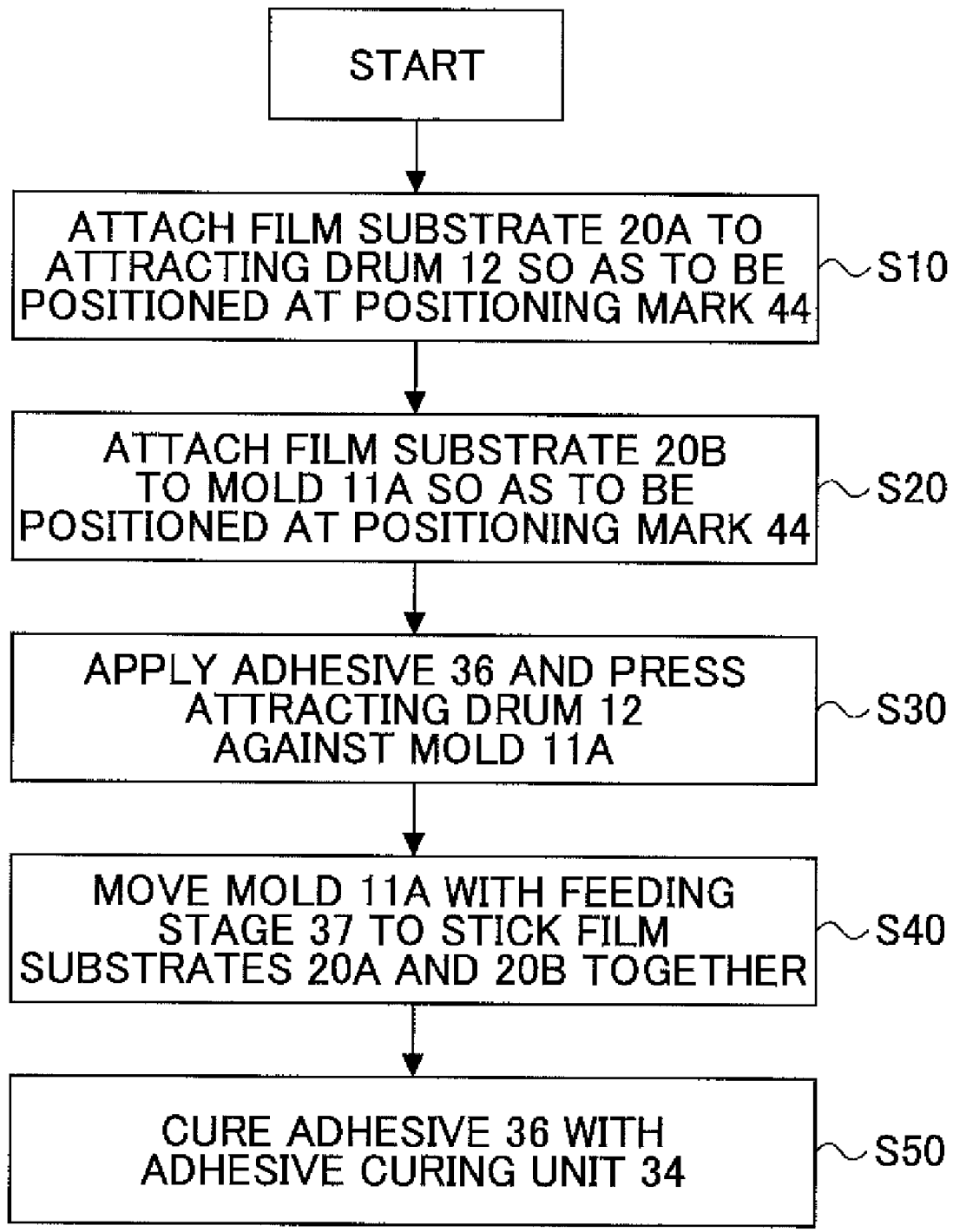
FIG. 9 is a flowchart illustrating the operations of the film sticking device according to the embodiment of the present invention.

FIGS. 5 through 9 are diagrams for illustrating the film sticking device 30 according to the embodiment of the present invention. FIG. 5 is a configuration diagram of the film sticking device 30. FIGS. 6A and 6B are diagrams for illustrating an attracting drum 12 (the attracting and holding unit 12) provided in the film sticking device 30. FIG. 7 is a block diagram illustrating the control system of the attracting drum 12 of the film sticking device 30. FIG. 8 is a timing chart illustrating the timing of ON/OFF in suction processing with respect to the vacuum chambers of the attracting drum 12. FIG. 9 is a flowchart illustrating the operations of the film sticking device 30. Note that in FIGS. 5 through 9, components equivalent to those shown in FIGS. 2 and 3 are denoted by the same reference numerals and their descriptions are omitted here.

First, referring to FIG. 5, a description is made of the entire configuration of the film sticking device 30. The film sticking device 30 according to this embodiment is a device that sticks together resin film substrates (hereinafter referred to as film substrates 20A and 20B) used for an electronic paper.

The film sticking device 30 is composed of the mold 11A, the attracting drum 12 acting as the attracting and holding unit, the suctioning unit 17, a feeding reel 31, a spacer dispersing unit 32, an adhesive curing unit 34, a dispenser 35, a feeding stage 37, a film cutter 39, and the like.

The mold 11A has the curved attracting surface 15A (specifically, the projecting semi-cylindrical surface) on its side opposing the attracting drum 12. In this embodiment, the curved attracting surface 15 projects upwardly. The curved attracting surface 15A has a multiplicity of minute holes formed therein. As the suctioning unit 17 is driven, suction processing is applied through the minute holes of the curved attracting surface 15A. The film substrate 20A is held on the curved attracting surface 15A by the suction processing.

The feeding stage 37 is provided at the lower part of the mold 11A. The feeding stage 37 has the function of moving the mold 11A in a horizontal direction in FIG. 5. Although the attracting drum 12 described below is fixed, the attracting drum 12 is configured to be capable of relatively moving in the horizontal direction in FIG. 5 along with the movement of the mold 11A by the feeding stage 37.

The attracting drum 12 has a cylindrical shape and is configured to rotate about the drum rotary shaft 40 in a direction as indicated by an arrow A in FIG. 5. The attracting drum 12 has the function of sticking (attaching) the film substrate 20B to the film substrate 20A by relatively moving on the mold 11A.

The attracting drum 12 has plural (eight in this embodiment) internal vacuum chambers of the first vacuum chamber 13-1 through the eighth vacuum chamber 13-8. The peripheral surfaces of the first vacuum chamber 13-1 through the eighth vacuum chamber 13-8 are, respectively, the first attracting surface 14-1 through the eighth attracting surface 14-8 having a multiplicity of minute holes formed therein.

Figure 6A:
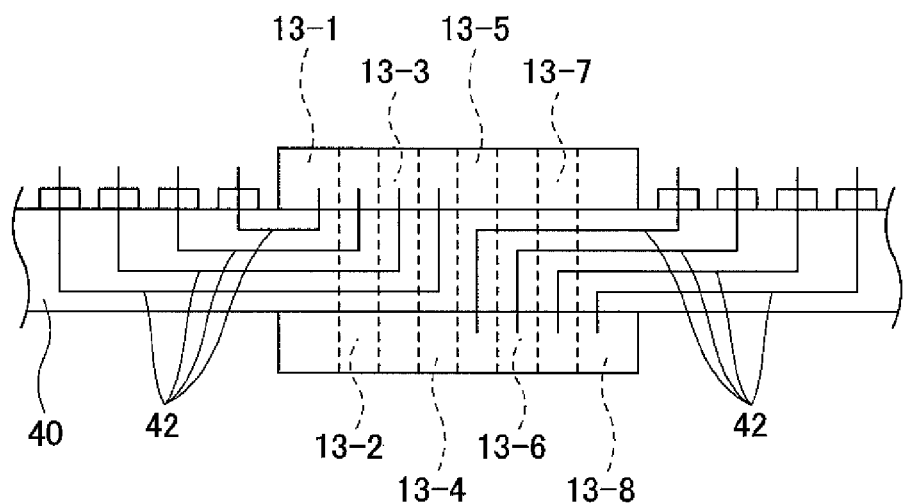
FIG. 6A is a diagram for illustrating the configuration of an attracting drum.
Figure 6B:
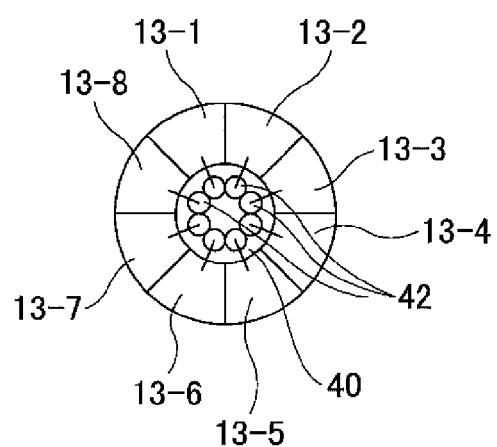
FIG. 6B is a diagram illustrating the cross section of the attracting drum.

As illustrated in FIG. 6A, the first vacuum chamber 13-1 through the eighth vacuum chamber 13-8 are, respectively, connected to first ends of communicating pipes 42. Further, the other ends of the communicating pipes 42 are, respectively, connected to the suctioning unit 17. As illustrated in FIG. 6B, the communicating pipes 42 are provided inside the drum rotary shaft 40. Accordingly, even if the suction drum 12 rotates, it is possible to apply the suction processing to the first vacuum chamber 13-1 through the eighth vacuum chamber 13-8.

Further, a first switching valve 47-1 through an eighth switching valve 47-8 are, respectively, provided in the midways of the communicating pipes 42 through which the suctioning unit 17 communicates with the first vacuum chamber 13-1 through the eighth vacuum chamber 3-8 (see FIG. 7). Accordingly, by the switching of the first switching valve 47-1 through the eighth switching valve 47-8, it is possible to separately apply the suction processing to the first vacuum chamber 13-1 through the eighth vacuum chamber 13-8.

When the suctioning unit 17 is driven and the valves 47-1 through 47-8 are opened to apply the suction processing through the minute holes of the first attracting surface 14-1 through the eighth attracting surface 14-8 of the first vacuum chamber 13-1 through the eighth vacuum chamber 13-8, the film substrate 20B is attracted onto the curved attracting surface 15A. Thus, the film substrate 20B is held by the mold 11A.

At this time, by the appropriate adjustment of the opening and closing of the valves 47-1 through 47-8, the suctioning unit 17 is allowed to separately apply the suction processing to the first vacuum chamber 13-1 through the eighth vacuum chamber 13-8. Thus, the attracting drum 12 can hold the film substrate 20B over its prescribed angle range rather than at its entire circumference.

The attracting and holding unit 12 thus configured is capable of applying pressure to the mold 11A through a drum pressure-applying unit 41 (applied pressure is indicated by an arrow F in FIG. 5). Further, the attracting and holding unit 12 has an angle detecting unit 45 and a pressure detecting unit 46 (see FIG. 7). The angle detecting unit 45 is an angle sensor that detects the rotational angle of the attracting and holding unit 12. Further, the pressure detecting unit 46 is a pressure sensor that detects pressure applied by the attracting and holding unit 12 through the drum pressure-applying unit 41. As described below, angle information detected by the angle detecting unit 45 and applied-pressure information detected by the pressure detecting unit 46 are transmitted to a control unit 49.

The feeding reel 31 has the film substrate 20 wound thereon. In this embodiment, the feeding reel 31 is configured to be capable of continuously feeding the film substrate 20B. The film substrate 20B fed from the feeding reel 31 is guided by a guide roller 38 and then wound on the attracting and holding unit 12. After that, the film substrate 20B is stuck to the film substrate 20A when the attracting and holding unit 12 relatively moves with respect to the mold 11A.

This embodiment illustrates a case where the film substrate 20B is continuously fed from the feeding reel 31, but it may be so arranged that the film substrate 20B is cut in advance so as to have a length corresponding to the length of the film substrate 20A (the length of the curved attracting surface 15A) and fed to the film sticking device 30.

The spacer dispersing unit 32 is a unit that disperses spacer onto the film substrate 20B. As described above, this embodiment refers to the device that sticks together the film substrates 20A and 20B used for an electronic paper. As electronic paper, liquid crystal is implanted between the film substrate 20A and the film substrate 20B. Therefore, space for implanting liquid crystal is required between the film substrate 20A and the film substrate 20B. For this reason, the spacer dispersing unit 32 disperses the spacer 33 to form the space.

The dispenser 35 has the function of applying an adhesive 36 for sticking the film substrate 20A and the film substrate 20B together. In this embodiment, the dispenser 35 is arranged ahead of the attracting and holding unit 12 relative to the relative movement direction of the attracting and holding unit 12 with respect to the mold 11A.

Thus, the adhesive 36 can be applied to the film substrate 20A before being stuck. After that, the film substrate 20B is pressed against the film substrate 20A by the attracting and holding unit 12, whereby the film substrate 20A and the film substrate 20B are stuck together. In this embodiment, the adhesive 36 is configured to be applied to the film substrate 20A immediately before the film substrate 20A and the film substrate 20B are stuck together, but it may be applied in advance to the entirety of the sticking surface of the film substrate 20A before the film substrate 20A and the film substrate 20B are stuck together. As described above, the adhesive 36 is applicable in various ways but may be appropriately selected in consideration of the properties or the like of the adhesive.

The adhesive curing unit 34 has the function of curing the adhesive 36 after the film substrate 20A and the film substrate 20B are stuck together by the adhesive 36. In this embodiment, the adhesive curing unit 34 is arranged behind the attracting and holding unit 12 relative to the relative movement direction of the attracting and holding unit 12 with respect to the mold 11A.

Curing processing by the adhesive curing unit 34 is selected according to the type of the adhesive 36. For example, if the adhesive 36 has ultraviolet curing properties, an ultraviolet irradiating unit is used as the adhesive curing unit 34. Further, if the adhesive 36 has heat curing properties, a heating unit is used as the adhesive curing unit 34.

In this embodiment, the adhesive curing unit 34 is arranged near the attracting drum 12, and the curing processing is started at a part where the film substrate 20A and the film substrate 20B are first stuck together. However, it is also possible that the entire surfaces of the film substrate 20A and the film substrate 20B are stuck together and then the entire bonding position of the film substrate 20A and the film substrate 20B is cured at once. These curing methods can be approximately selected in consideration of the properties or the like of the adhesive.

The film cutter 39 has the function of cutting the film substrate 20B when the film substrate 20B is fed from the sticking start position P1 to the sticking end position P2 by the movement of the attracting and holding unit 12 and stuck to the film substrate 20A. Note that the film substrate 20B may be cut at a position where the film substrate 20B is just fed from the feeding reel 31. However, in order to maintain a state in which another film substrate to be stuck is attracted onto the attracting and holding unit 12, the film substrate 20B is preferably cut when the attracting and holding unit 12 moves to a position as indicated by dotted lines in FIG. 5 (in a state in which the film substrate 20B is fed beyond the sticking end position P2) from the viewpoint of making a transition to the next sticking operation smooth.

Next, referring to FIG. 7, a description is made of the control system of the attracting drum 12.

The suctioning unit 17, the drum pressure-applying unit 41, the angle detecting unit 45, the pressure detecting unit 46, and the first switching valve 47-1 through the eighth switching valve 47-8 described above are connected to the control unit 49. The control unit 49 has the function of collectively controlling the operations of the film sticking device 30.

The angle information detected by the angle detecting unit 45 and the applied-pressure information detected by the pressure detecting unit 46 are transmitted to the control unit 49. The control unit 49 performs the switching processing for the first switching valve 47-1 through the eighth switching valve 47-8 based on the angle information.

As described above, the attracting drum 12 is pressed against the mold 11A (the curved attracting surface 15A) by the drum pressure-applying unit 41. If the pressure applied by the drum pressure-applying unit 41 is varied in accordance with the movement of the attracting drum 12, even and secured sticking of the film substrate 20A and the film substrate 20B cannot be achieved. Therefore, the control unit 49 controls, based on the pressure applied to the mold 11A by the attracting drum 12, the drum pressure-applying unit 41 such that the attracting drum 12 applies constant and secured pressure to the mold 11A.

Next, a more specific description is made of the switching control of the first switching valve 47-1 through the eighth switching valve 47-8 by the control unit 49.

The control unit 49 in this embodiment makes control such that the timing of opening and closing the first switching valve 47-1 through the eighth switching valve 47-8 is sequentially delayed by 45° as the rotational angle of the attracting drum 12. Further, after opening the switching valves 47-1 through 47-8, the control unit 49 maintains their opening conditions until the attracting drum 12 rotates by 180°. Then, the control unit 49 performs valve closing processing and performs control to maintain the closing conditions of the switching valves 47-1 through 47-8 until the attracting drum 12 rotates by 180°. In other words, the control unit 49 is configured to make the ON/OFF control of each of the switching valves 47-1 through 47-8 through an interval of 180°.

FIG. 8 is the timing chart illustrating the ON/OFF of vacuum processing with respect to the first vacuum chamber 13-1 through the eighth vacuum chamber 13-8 when the control unit 49 performs the above control. In this embodiment, a position immediately before the first vacuum chamber 13-1 of the attracting and holding unit 12 contacts the film substrate 20B is defined as 0°.

When the control unit 49 determines that the attracting and holding unit 12 has a rotational angle of 0° according to the angle information from the angle detecting unit 45, the control unit 49 opens the first switching valve 47-1. Thus, the connection of the first vacuum chamber 13-1 to the suctioning unit 17 through the communicating pipe 42 is established, and the vacuum processing with respect to the first vacuum chamber 13-1 is started (ON).

Then, when the attracting and holding unit 12 rotates by 45°, the control unit 49 opens the second switching valve 47-2 with the first switching valve 47-1 opened. Subsequently, the control unit 49 sequentially switches the switching valves 47-3 through 47-8 every time the attracting and holding unit 12 rotates by 45°. Thus, as illustrated in FIG. 8, the vacuum processing is sequentially applied to the second vacuum chamber 13-2 through the eighth vacuum chamber 13-8. On the other hand, the control unit 49 sequentially performs the valve closing processing when the switching valves 47-1 through 47-8 remain opened until the attracting drum 12 rotates by 180°. FIG. 8 illustrates the switching timings of the switching valves 47-1 through 47-8 when the attracting drum 12 rotates over a range of 0° through 360°.

As described above, in this embodiment, the position at which the first vacuum chamber 13-1 (the first attracting surface 14-1) of the attracting and holding unit 12 contacts the film substrate 20B is defined as 0°. Accordingly, when the first attracting surface 14-1 contacts the film substrate 20B, the suction processing is applied to the first vacuum chamber 13-1. Consequently, the film substrate 20B is attracted and held by the first vacuum chamber 13-1 (the first attracting surface 14-1).

Where the film substrate 20B is held by the first attracting surface 14-1 as described above, the film substrate 20B is in the state of being wound around the attracting drum 12 over a range of 180°. Thus, the film substrate 20B is in the state of contacting the sixth attracting surface 14-6 through the eighth attracting surface 14-8 as well.

As described above, by controlling the switching valves 47-1 through 47-8, the control unit 49 makes control to apply the suction processing to the vacuum chambers (the first vacuum chamber 13-1 and the sixth vacuum chamber 13-6 through the eighth vacuum chamber 13-8 in the example illustrated in FIG. 5) corresponding to the attracting surfaces (the first attracting surface 14-1 and the sixth attracting surface 14-6 through the eighth attracting surface 14-8 in the example illustrated in FIG. 5) that contact the film substrate 20B.

As illustrated in FIG. 8, since the attracting surfaces attracting the film substrate 20B are switched every time the attracting drum 12 rotates by 45°, the attracting drum 12 holds the film substrate 20B over its range of 180° at all times. Thus, the film sticking device 30 can reliably feed the film substrate 20B from the feeding reel 31 and stick the fed film substrate 20B to the film substrate 20B attached to the curved attracting surface 15A.

On the other hand, at the position at which the attracting drum 12 applies pressure to the film substrates 20A and 20B, the attracting drum 12 comes into contact with the curved attracting surface 15A of the mold 11A. At this position, the film substrate 20A and the film substrate 20B are stuck together. Thus, as described above, if the film substrate 20B remains held by the attracting drum 12 even after the film substrate 20A and the film substrate 20B are stuck together, the force for holding the film substrate 20B by the attracting drum 12 acts in turn as a force for separating the film substrate 20B from the film substrate 20A.

Therefore, in a state illustrated in FIG. 5, the control unit 49 stops the fifth switching valve 47-5 to complete the suction processing with respect to the fifth vacuum chamber 13-5 (the fifth attracting surface 14-5). Thus, the separation of the stuck film substrates 20A and 20B due to the attracting drum 12 can be prevented. Note that the control unit 49 controls the second switching valve 47-2 through the fourth switching valve 47-4 so as not to apply the suction processing to the vacuum chambers (the second vacuum chamber 13-2 through the fourth vacuum chamber 13-4 in the example illustrated in FIG. 5) corresponding to the other attracting surfaces (the second attracting surface 14-2 through the fourth attracting surface 14-4 in the example illustrated in FIG. 5) that do not contact the film substrate 20B.

As illustrated in FIG. 8, since the attracting surfaces that do not attract the film substrate 20B are also switched every time the attracting drum 12 rotates by 45°, the suction processing is not applied to the parts of the attracting drum 12 that do not contact the film substrate 20B. Thus, besides preventing the separation of the stuck film substrates 20A and 20B described above, it is possible to suppress the useless driving of the suctioning unit 17 and attain the reduction of running costs.

Next, a description is made of the operations of the film sticking device 30 thus configured. FIG. 9 is a flowchart illustrating the operations of the film sticking device 30 at the time of sticking the film substrates 20A and 20B together.

When the stick processing is started, processing for attaching the film substrate 20A to the mold 11A is performed in step 10 (step is abbreviated as S in FIG. 9). In this embodiment, the film substrate 20A cut into a predetermined shape is placed on the curved attracting surface 15A. However, it is also possible to use the same feeding reel as the feeding reel 31 onto which the film substrate 20A is wound and continuously feed the film substrate 20A onto the curved attracting surface 15A.

Further, a positioning mark 44 is provided at the sticking start position P1 of the curved attracting surface 15A. In attaching the film substrate 20A to the curved attracting surface 15A, the curved attracting surface 15A and the film substrate 20A are positioned based on the positioning mark 44. Thus, the film substrate 20A can be attached to the predetermined position on the curved attracting surface 15A with high accuracy.

When the film substrate 20A is attached to the predetermined position on the curved attracting surface 15A as described above, the control unit 49 drives the suctioning unit 17. Thus, the film substrate 20A is attracted onto the curved attracting surface 15A and held by the mold 11A.

Next, in step 20, the tip end of the film substrate 20B fed from the feeding reel 31 is set to the curved attracting surface 15A with the positioning mark 44. Consequently, the film substrate 20A and the film substrate 20B are positioned and overlapped with each other at the sticking start position P1.

Then, in step 30, the adhesive 36 is applied to the substrate 20A by the dispenser 35. Further, while the attracting drum 12 moves to the sticking start position P1, the control unit 49 drives the drum pressure-applying unit 41 to apply predetermined pressure to the mold 11A. Thus, the pressure is also applied to the film substrate 20A and the film substrate 20B interposed between the attracting drum 12 and the mold 11A, whereby the film substrate 20A and the film substrate 20B are stuck together.

In step 40, the feeding stage 37 starts moving in the direction as indicated by the arrow V. Thus, the attracting drum 12 starts relatively moving on the curved attracting surface 15A in a direction opposite to the direction as indicated by the arrow V. At this time, the dispenser 35 is arranged ahead of the attracting and holding unit 12 relative to the relative movement direction (the direction opposite to the direction as indicated by the arrow V) of the attracting and holding unit 12 with respect to the mold 11A. Therefore, the adhesive 36 is sequentially applied to the film substrate 20A. Further, as the attracting drum 12 moves, the film substrate 20B is sequentially pressed against the film substrate 20A onto which the adhesive is applied so as to perform the stick processing.

At this time, the attracting drum 12 is configured to move over a range of 180° with the film substrate 20B attracted and held thereon as described above, press the film substrate 20B against the film substrate 20A so as to be stuck together, and immediately release the holding of the film substrate 20B by the attracting drum 12 after the film substrate 20A and the film substrate 20B are stuck together. Thus, the separation of the film substrate 20B from the film substrate 20A due to the attracting drum 12 can be surely prevented.

Further, processing in step 40 is performed during a period in which the attracting drum 12 moves from the sticking start position P1 to the sticking end position P2. Therefore, even if air bubbles exist in the adhesive 36 used for bonding the film substrates 20A and 20B to each other, the air bubbles are forced to move to the sticking end position P2 along with the movement of the attracting drum 12 and then released from the end of the attracting drum 12 to an outside.

Accordingly, no air bubbles remain inside the adhesive 36 after the film substrates 20A and 20B are stuck together and thus there is no need to separately perform the air-bubbles release processing after the film substrates 20A and 20B are stuck together, which in turn makes it possible to simplify the stick processing. Moreover, since the attracting drum 12 is caused to apply constant pressure to the mold 11A when the control unit 49 controls the drum pressure-applying unit 41, the occurrence of unevenness in the adhesive 36 can also be prevented.

In step 50, the adhesive curing unit 34 performs the curing processing on the adhesive 36. In this embodiment, since ultraviolet curing resin is used as the adhesive 36, the adhesive curing unit 34 irradiates the adhesive 36 with ultraviolet rays. In this case, the adhesive curing unit 34 is arranged behind the attracting and holding unit 12 relative to the relative movement direction (the direction opposite to the direction as indicated by the arrow V) of the attracting and holding unit 12 with respect to the mold 11A. Therefore, the adhesive curing unit 34 sequentially performs the curing processing on the adhesive 36 applied by the dispenser 35.

The processing in steps 30 through 50 is performed until the attracting drum 12 moves to the sticking end position P2. When the film substrates 20A and 20B are stuck together over a range from the sticking start position P1 to the sticking end position P2, the film substrates 20A and 20B are cut by the film cutter 39 and thus the stick processing for the film substrate 20A and the film substrate 20B is completed.

Since the film sticking device 30 according to the embodiment described above is configured to stick and shape the film substrates 20A and 20B by moving the attracting drum 12, the film sticking device 30 can perform the sticking processing for the film substrates 20A and 20B only with the one mold 11A. That is, since the number of molds leading to high manufacturing costs can be reduced, the cost reduction of the film sticking device 30 is attainable. Further, since high-accuracy molding processing is not required to engage plural molds with each other, the cost reduction is also attainable.

Figure 10:
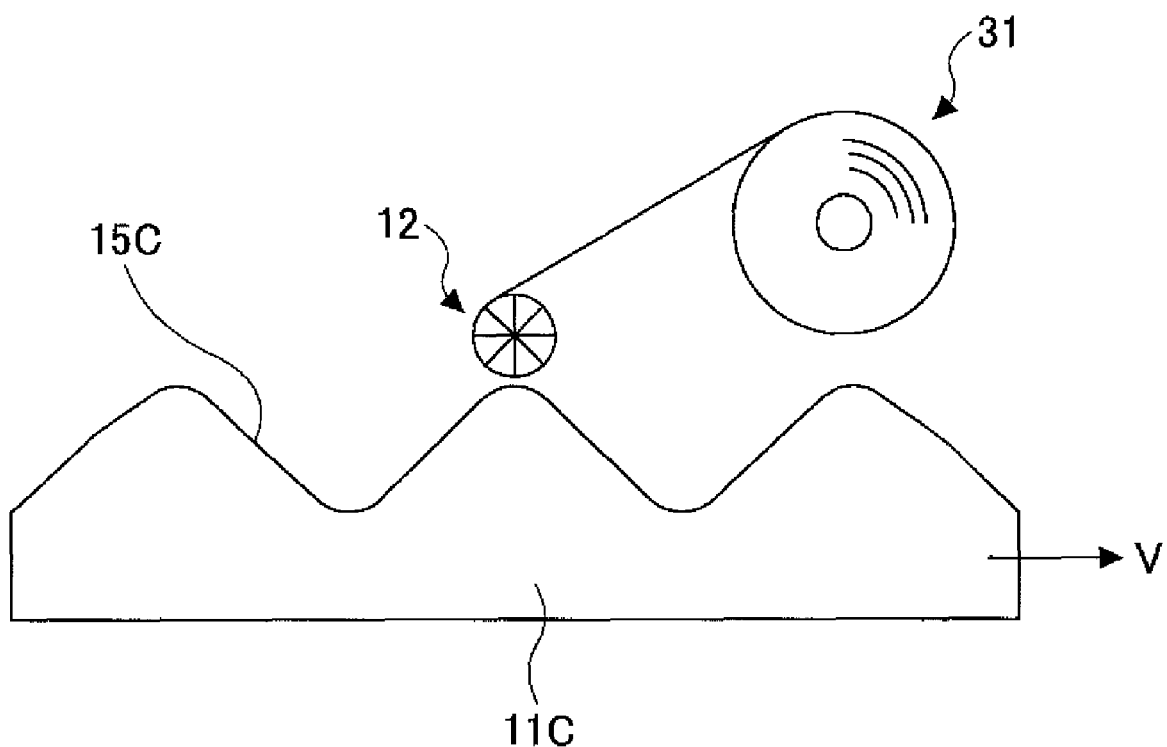
FIG. 10 is a configuration diagram illustrating another embodiment in which the curved attracting surface of a mold is formed into a wave shape.

Note that in the embodiment described above, the mold 11A has an upwardly projecting semi-cylindrical shape. However, as illustrated in FIG. 10, a curved attracting surface 15C of a mold 11C may be a free-form surface. Further, the film sticking device according to the embodiment is attainable even if the attracting drum and the mold are reversely arranged in a vertical direction.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. A method of manufacturing electronic paper having first and second film substrates with a liquid crystal held therebetween, the method comprising:
    attaching the first film substrate to a curved attachment surface of a mold;
    attaching the second film substrate to a cylindrical surface of an attracting and holding unit over a prescribed angle range, the cylindrical surface being defined by attracting surfaces of vacuum chambers of the attracting and holding unit; and
    sticking the second film substrate to the first film substrate by pressing the second film substrate against the first film substrate while causing the attracting and holding unit to rotate and relatively move on the curved attachment surface of the mold,
    wherein, in said sticking, as the attracting and holding unit rotates, the vacuum chambers of the attracting and holding unit are sequentially caused to start attracting respective portions of the second film substrate opposed to the vacuum chambers to the respective attracting surfaces by suction upon contacting the respective opposed portions of the second film substrate, and
    the vacuum chambers are sequentially caused to stop attracting the respective opposed portions of the second film substrate upon the respective opposed portions sticking to the first film substrate.

2. The method as claimed in claim 1, wherein the vacuum chambers are sequentially caused to start and stop attracting the opposed portions of the second film substrate by being sequentially subjected to a start and a stop, respectively, of suctioning of the vacuum chambers.

3. The method as claimed in claim 1, further comprising:
    applying an adhesive to at least one of the first film substrate and the second film substrate; and
    curing the adhesive after said sticking the second film substrate to the first film substrate.

4. The method as claimed in claim 1, further comprising:
    implanting the liquid crystal between the first film substrate and the second film substrate after said sticking the second film substrate to the first film substrate.

* * * * *